May 31, 1966   G. PAHL ETAL   3,253,610
FLUID OPERATED REVERSIBLE VALVE
Filed June 12, 1964                                                2 Sheets-Sheet 1

INVENTORS.
GUNTER PAHL
JOSEPH MÜLLER
BY
*Arthur H. Swanson*
ATTORNEY.

May 31, 1966  G. PAHL ETAL  3,253,610
FLUID OPERATED REVERSIBLE VALVE
Filed June 12, 1964  2 Sheets-Sheet 2
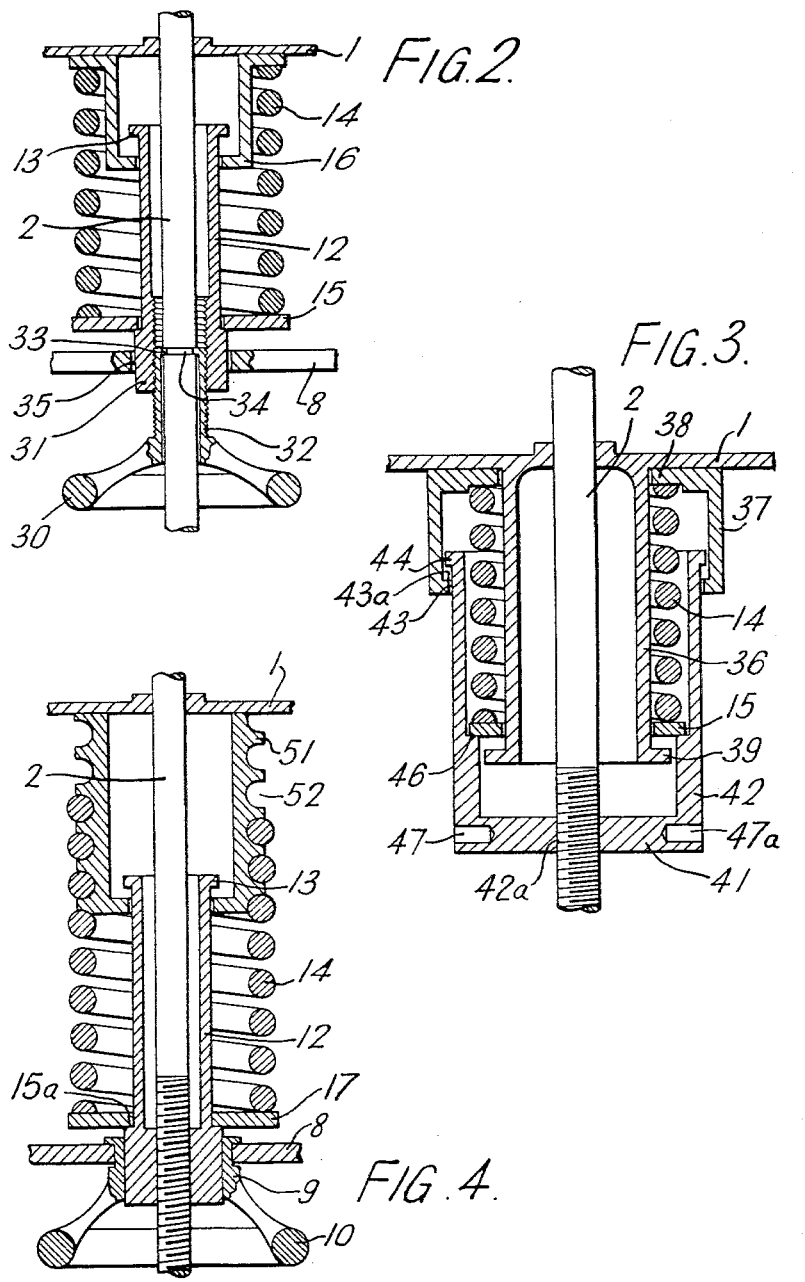
INVENTORS
GUNTER PAHL
JOSEPH MÜLLER
BY
Arthur H. Swanson
ATTORNEY.

United States Patent Office 3,253,610
Patented May 31, 1966

3,253,610
FLUID OPERATED REVERSIBLE VALVE
Gunter Pahl, Dornigheim (Main), and Joseph Müller, Ulmbach, Schluchtern, Germany, assignors to Honeywell G.m.b.H., Frankfurt am Main, Germany, a corporation of Germany
Filed June 12, 1964, Ser. No. 374,670
Claims priority, application Germany, June 18, 1963,
H 49,478
7 Claims. (Cl. 137—269)

It is an object of this invention to disclose a fluid operated reversible valve actuator which allows the valve to be opened or to be closed when the control pressure increases.

It is another object of this invention to provide an improved reversible valve actuator which may be converted from normally open to normally closed action without disassembly of the valve and the actuator itself.

It is a more specific object of the invention to use a single handwheel or other manually-operated means for reversing the operation of the actuator, for adjusting the load of the valve spring and for auxiliary manual operation of the valve.

Another object of the invention is to provide a bushing about a valve stem that has flanges for selectively engaging the upper or the lower end of a valve spring and which is movable in an axial direction with respect to the valve stem by means of a handwheel which, in turn, is movable in an axial direction with respect to the bushing.

A better understanding of the present invention may be had from the following detailed description, when read in connection with the accompanying drawings in which:

FIG. 2 is a view similar to FIG. 1 showing a second embodiment of the invention which differs from that of FIG. 1 for moving the sleeve with respect to the valve stem;

FIG. 3 shows a third embodiment of the invention;

FIG. 4 shows an embodiment similar to that of FIG. 1, and additionally shows means for adjusting the effective length of the spring;

Figure 1:
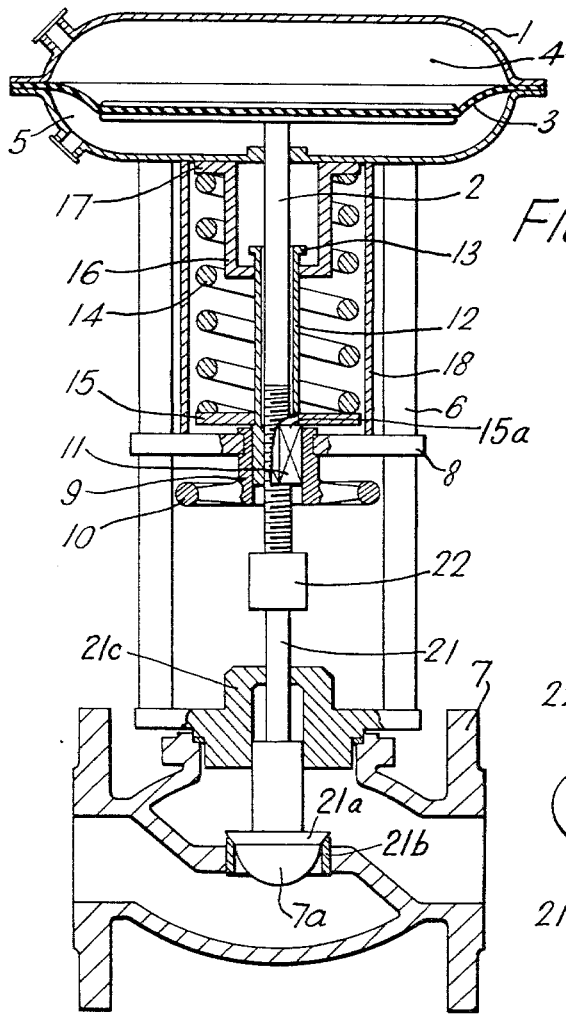
FIG. 1 is a vertical sectional view of a reversible valve actuator showing one way of moving the bushing or sleeve with respect to the valve stem.

FIG. 1 shows a membrane-controlled actuator for pneumatic valve operation. The membrane 3 divides the membrane housing 1 into an upper chamber 4 and a lower chamber 5. The membrane 3 is fixed to actuator stem 2. The membrane housing 1 is fixed to the valve housing 7 by means of a frame 6. About in the middle of the frame 6, a crosspiece 8 is provided in which the hub 9 of the handwheel 10 is rotatably guided, but which is immovable, in an axial direction.

The hub 9 of the handwheel surrounds the lower part 11 of the sleeve, the upper part 12 of which bears an upper collar 13. The part 11 dipping into the hub 9 of the handwheel 10, is formed as a hexagon or the like and the inner opening of the hub 9 has a corresponding shape. Thus, the part 11 is movable within the hub 9 in an axial direction but will be rotated if the handwheel is turned. The helical pressure spring 14 is provided between a lower spring plate 15 and an upper spring plate 16 which approximately has the shape of a cup. The upper end of the helical sring engages the collar 17 of the upper spring plate 16. The upper part of sleeve 12 towers through a bore in the bottom of the upper spring plate 16. A collar 13 of the sleeve 12 can be brought into engagement with the inner bottom surface of the upper spring plate 16. The lower spring plate 15 rests upon a collar 15a of the sleeve 12, as will be seen more clearly from FIG. 4.

The actuator is in the position as shown in FIG. 1 when the same for example normal air pressure is in both chambers 4 and 5 of the membrane housing. The operation range of the pneumatic control usually does not start at zero pressure, but with a minimum pressure which is different from zero. The control range is limited by a predetermined maximum pressure.

In FIG. 1 the actuator is adjusted in such a manner that the air under pressure is fed into the lower chamber 5, and an increase in this air pressure will open the valve.

By turning the handwheel 10, the sleeve 11, 12 will be threaded so far in the upper direction until the lower spring plate 15 biasses the spring 14 to such an extent that the spring force is equal to the force of the minimum air pressure supplied to the membrane 3 at the beginning of the operation range. If the pressure in the chamber 5 is then increasing, the membrane 3 will move upwardly. Under this condition, the actuator stem 2 and the valve stem 21 will move the valve plug 21a away from the valve-seat 21b.

Since the lower part 11 of sleeve 12 is fixed for movement in an axial direction to the actuator stem 2, when moving upwardly the stem 2, the sleeve 12 is also moved upwardly and with its lower part 11 takes with it the lower spring plate 15. Therefore, the spring is pressed together and loaded, and acts against the control air pressure. The upper spring plate 16 is abutting against the membrane housing 1. The valve plug 21a travels into such a position in which the spring force and the air pressure in the chamber 5 are effecting the same force to the valve stem. The membrane 3 and the spring 14 are of such dimensions that, when reaching the upper limit of the air pressure range, the desired valve-stroke has been travelled through. If the air pressure increases beyond this maximum value, the stroke of the plug 21a is limited by the plug guide 21c or alternatively by means of a stop for the membrane 3.

When the operation is inverted, the air pressure will be applied to the upper chamber 4 of the membrane housing 1. Under this condition the valve will be moved to its closed position when an increase in air pressure is applied to the chamber 4. In order to reverse this operation, the sleeve 12 is threadedly moved in a downward direction on the stem by rotating the handwheel 10 and the hexagon 11 engaging the bore in the hub 9 of the handwheel 10 is engaged. This movement of the sleeve 12 with respect to the actuator stem 2 continues until the collar 13 engages the inner bottom surface of the upper spring plate 16. When this point is reached the lower spring plate 15 will no longer rest upon the hexagon-shaped portion 11 of the sleeve 12, but will instead rest on the hub 9 of the handwheel. Under this condition the hub 9 will thus abut against the cross-piece 8 of the frame 6 as shown in FIG. 4. Therefore, the abutment point of the spring 14 has been changed from the upper to the lower end of the spring. The hexagon 11 of the sleeve is completely dipping into the inner space of the hub 9. The sleeve 12, then, by means of the handwheel 10 is threaded with respect to the stem 2 downwardly until the spring is loaded in accordance with the minimum control air pressure at the beginning of the operation range.

When threading down the sleeve 12, its collar 13 takes with it the upper spring plate 16 and thereby is loading the spring. If then, under the influence of the increasing air pressure in the chamber 4, the stem 2 is moved downwardly, the stem 2 with its thread and the corresponding inner thread of the part 11 of the sleeve takes with it the sleeve 12 and the upper spring plate 16. Also under these conditions the spring 14 is acting against the control pressure. If the maximum of the air pressure range is reached, the plug 21a is seating upon the valve-seat 21b and closes the opening of the valve with the desired closing pressure.

Figure 5:
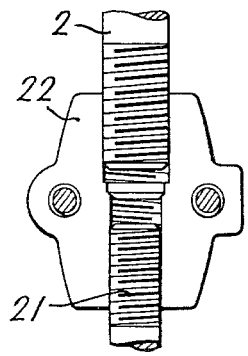
FIG. 5 shows an elevation view of a means for adjustably connecting the actuator stem with the stem of the valve.
Figure 5A:
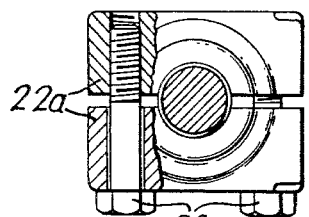
FIGURE 5A shows a plan view of a means for adjustably connecting the actuator stem with the stem of the valve.

As is evident from the drawing, the whole operation stroke of the valve can be travelled through by means of turning the handwheel independently of the operation mode of the actuator, i.e., under normally open as well as under normally closed conditions. The handwheel, therefore, serves not only for reversing the operation of the actuator and for adjusting the air pressure operation range but also for the auxiliary manual operation of the valve. No additional tools are needed for these jobs. A connecting element 22, as later on will be explained with reference to FIG. 5, is provided for adjusting the whole length of the actuator stem 2 and the valve stem 21 together. The embodiment of the invention described above is characterized in that the handwheel 10 is fixed to the frame in axial direction and that the relative axial position of the handwheel with respect to the stem 2 can be changed. A cylindrical tube 18 protects the spring against moisture and dirt.

Another embodiment of the invention is shown in FIG. 2. There are only those parts of the device shown which are needed for explaining the differences between this embodiment and the embodiment as shown in FIG. 1. According to this embodiment of the invention, the handwheel is turnable but in axial direction unmovable with respect to the stem and is borne by the stem. For reversing the operation, the sleeve 12 is threaded with respect to the hub of the handwheel. The pressure spring 14, a cup-like shaped upper spring plate 16, and a lower spring plate 15 are again mounted between the membrane housing and the cross-piece 8 of the frame. The hub 32 of the handwheel 30 is directly and turnably mounted to the actuator stem 2. With its collar 33 the handwheel engages a groove 34 surrounding the stem 2 and, thus, can be turned but cannot be moved in axial direction with respect to the stem 2.

The sleeve 12 on its lower end has a portion 31 forming a hexagon or a square which is movable in axial direction inside a corresponding hole 35 of the cross-member 8 and is guided by this hole and protected against rotation. Therefore, when turning the handwheel 30, the sleeve 12 will be threaded upwardly or downwardly with respect to the stem 2. The other details of the actuator are corresponding to those of the embodiment of FIG. 1.

During the operation, the sleeve 12 is coupled rigidly with the stem 2 in axial direction. When moving the stem upwardly and downwardly, depending on the operation mode, the spring abuts with its upper or its lower end and acts against the force supplied to the stem. Also with this embodiment, the handwheel cannot only be used for reversing the operation and adjusting the operation range but also for manual operation of the valve. The actuator can be reversed without the need for any additional tools and without any disassembling of the valve or the actuator.

Instead of a separate tube for protecting the spring, the sleeve itself can be used for this purpose. An embodiment showing such a device is shown in FIG. 3. Here a bushing 36 surrounding the stem 2 is fixed to the frame, for instance, to the membrane housing 1 and serves as an abutment for both spring plates. The upper spring plate 37 has an inner collar 38 against which the spring 14 abuts with its upper end. The spring 14 surrounds the bushing 36. On its lower end, the bushing 36 has a collar 39 which acts as an abutment for the lower spring plate 15 when the sleeve 42 by means of a thread at 42a in its bottom portion 41 is fixed to the actuator stem 2.

In the bottom of the cup-like upper spring plate 37, a bore 43 is provided against an inner edge surface 43a of which the collar 44 of the sleeve 42 can be brought into abutting engagement. Adjusting the preload of the spring 14 and reversing the operation is effected by threading the sleeve 42 with respect to the stem 2. For this purpose, the sleeve 42 either has an outer shape which is usable as a hand-operation means, for instance, is formed like a handwheel or has areas or holes as indicated by reference numerals 47, 47a for inserting bolts or the like for manual operation.

The arrangement again is shown under a condition when no air pressure is fed into one of the previously-mentioned membrane chambers. When the minimum air pressure is reached in the lower membrane chamber and the preload of the spring is overcome, the stem 2 and the sleeve 42 are moving upwardly and the step-like portion 46 surrounding the sleeve 42 on its inner side by means of the spring plate 14 presses the spring 14. The upper end of the spring is abutting against the membrane housing 1 via the upper collar 38 of the spring plate 37.

For reversing the operation the sleeve 42 will be threaded downwardly with respect to the stem to the dotted line position where the lower spring plate 15 engages the collar 39 of the bushing 36. Then the lower end of the spring 14 is fixed. The sleeve 42 will be threaded further downwardly and with its collar 44 takes with it the upper spring plate 37 because of the engagement between the collar 44 and the edge of the hole 43 in the bottom of the upper spring plate 37. The spring 14, therefore, is preloaded as desired. If now the stem 2 because of increasing air pressure in the upper chamber 4 of the membrane housing 1 is moved downwardly, it takes with it the sleeve 42 which by means of the collar 44 and the upper spring plates 37 presses the spring 14. Also with this arrangement, the spring under both conditions acts as a pressure spring.

FIG. 4 shows how the effective length of a helical spring 14 can be altered by threading such a spring on a mounting member 51 having a thread corresponding to the helical shape of the spring. The upper spring plate member 51, shown in FIG. 4, is shown as a cylindrical tube with an outer thread corresponding to the diameter and lead of the helical spring 14. The more the spring 14 is threaded onto the holding tube 51, the less is the effective length of the spring. Thus, the spring force can be adjusted without any disassembling or interruption of the operation. It is desirable to have the holding tube 51 knurled for manual operation or provide it with areas or bores for inserting of bolts or other tools. The operation of the embodiment as shown in FIG. 4 is similar to that of FIGURE 1 as the handwheel 10 with its hub 9 is rotatably but not slidably borne in the cross-member 8 of the valve frame. The sleeve 12 and the square or hexagon 11 of the sleeve does not have to be a single piece but can be two separate parts which are fixed together in appropriate manner. Instead of a collar 13 of the sleeve 12, the transmission of the force between the sleeve and the upper spring plate can also be effected by separate means such as a snap-ring or a nut mounted on the upper end of the sleeve 12.

For adjusting the whole length of the connection means between the membrane 3 of the actuator and the valve plug 21a, as shown in FIG. 5, the actuator stem 2 and the valve stem 21 are connected together by clamping means 22. At least one of the stems is provided with a thread on its end which dips into the pair of clamping jaws 22, which clamping jaws have a corresponding thread. In the example, as shown in FIG. 5, the diameter of the actuator stem 2 is larger than the diameter of the valve stem 21. The end portions of both stems are provided with a thread which is threaded into the corresponding thread of the pair of clamping jaws. The relative distance between the two stems can be altered by threading the stems into the corresponding thread of the pair of clamping jaws. As soon as the correct distance between the stems is reached, this position will be fixed by tightening the screws 23.

From the aforementioned description, it can be seen that the same actuator parts can be employed beneficially to perform either a normally open or normally closed valve or other similar operation, thereby reducing the number of parts that have heretofore been required to be purchased and stored when such a valve conversion is desired.

What is claimed is:

1. A reversible, fluid-actuated valve including a stem and plug for operation in a normally open and a normally closed operating position, comprising: a helical reset-spring positioned about the stem, a sleeve surrounding the stem and in threaded engagement therewith, said sleeve being positioned for movement in an axial direction with respect to the stem, a separate collar formed on each end portion of the sleeve, a separate retaining plate positioned adjacent each end of the spring against which the ends of the spring are abutted, a handwheel surrounding the stem and rotatably connected with the sleeve and including means to transmit motion in an axial direction thereto to move one of said collars of the sleeve into engagement with its associated spring-retaining plate while the other collar is moved out of engagement with its associated spring-retaining plate and vice versa thereby providing a selectively adjustable fixed abutment for one or the other of the opposite ends of the spring and wherein the handwheel adjustment further provides a means of manually moving the stem and plug between an open and closed position.

2. The valve defined in claim 1 wherein said means comprises a stationary member connected to the handwheel to retain it in a single plane of rotation and wherein the handwheel is provided with a hub portion in engagement with an end of the sleeve to move the sleeve in an axial direction along the stem when the handwheel is rotated.

3. The valve defined in claim 1 wherein said means comprises a lip and a groove connection employed between the handwheel and stem to provide joint axial movement of the handwheel and wherein a stationary wall member is employed having an aperture formed therein through which one end of the sleeve is mounted.

4. The valve defined in claim 1 wherein said means comprises a stationary member positioned about a portion of the handwheel to retain it in a single plane of rotation and wherein the handwheel is provided with a hub portion in engagement with an end of the sleeve to move the sleeve in an axial direction along the stem when the handwheel is rotated and wherein the end of the sleeve and the associated contacting hub surface of the handwheel are constructed of a polygonal configuration.

5. The valve defined in claim 1 wherein, at least one of the spring-retaining plates is of a cup-shaped configuration and is provided at its upper end with a collar to engage one end of the spring, the lower end of the cup-shaped spring-retaining plate has an aperture therein to accommodate the passage of one end of the sleeve therethrough, and wherein rotation of the handwheel in one direction will cause the collar inside the cup-shaped spring plate to contact the inner lower surface of the cup adjacent the aperture and to be thereafter moved therewith.

6. The valve defined in claim 1 wherein, a holding member having a helical groove therein is employed adjacent one end of the spring to accommodate the threading of the last-mentioned end of the spring thereon.

7. The valve defined in claim 1 wherein, the stem is constructed of two aligned parts, a threaded surface on the end of at least one of said parts, and a pair of serrated jaw members are positioned to surround and clamp the ends of the stem parts in alignment with one another.

References Cited by the Examiner
UNITED STATES PATENTS

| 2,020,773 | 11/1935 | Ernst | 251—63 |
| 2,903,011 | 9/1959 | Long | 251—61 X |

FOREIGN PATENTS

| 921,607 | 12/1954 | Germany. |
| 929,761 | 7/1955 | Germany. |

MARTIN P. SCHWADRON, *Acting Primary Examiner.*